United States Patent [19]
Morishige et al.

[11] Patent Number: 5,968,662
[45] Date of Patent: Oct. 19, 1999

[54] COATED METAL SHEET BONDABLE WITH ADHESIVE

[75] Inventors: Michiharu Morishige; Keiichi Sawaya; Hidetoshi Yamabe; Tetsuo Sakai; Toshio Nagatomo; Hideyasu Kamikawa, all of Ichikawa; Akihiro Sawaguchi; Hiroshi Matsuo, both of Tokyo, all of Japan

[73] Assignees: Nisshin Steel Co., Ltd.; Dainippon Ink & Chemicals, Inc., both of Japan

[21] Appl. No.: 08/953,915

[22] Filed: Oct. 20, 1997

Related U.S. Application Data

[63] Continuation of application No. 08/612,384, Mar. 7, 1996, abandoned.

[30] Foreign Application Priority Data

Mar. 8, 1995 [JP] Japan .................................. 7-077178

[51] Int. Cl.⁶ .................................................. B32B 15/08
[52] U.S. Cl. ........................ 428/458; 428/457; 428/458; 428/480; 428/482
[58] Field of Search .................... 428/457, 458, 428/480, 482

[56] References Cited

U.S. PATENT DOCUMENTS

| | | | |
|---|---|---|---|
| 4,205,115 | 5/1980 | Piccirilli et al. | 428/334 |
| 4,533,704 | 8/1985 | Alexander et al. | 525/440 |
| 4,734,467 | 3/1988 | Yamada et al. | 525/440 |
| 4,844,944 | 7/1989 | Graefe et al. | 428/357 |
| 5,100,735 | 3/1992 | Chang | 428/515 |
| 5,229,214 | 7/1993 | Maze et al. | 428/458 |
| 5,238,999 | 8/1993 | Cook et al. | 525/124 |
| 5,283,126 | 2/1994 | Rasmussen et al. | 428/457 |
| 5,328,579 | 7/1994 | Kasukawa et al. | 204/181.1 |
| 5,378,275 | 1/1995 | Shiraga et al. | 106/417 |
| 5,391,429 | 2/1995 | Otani et al. | 428/327 |
| 5,418,309 | 5/1995 | Tanabe et al. | 528/45 |
| 5,460,892 | 10/1995 | Bederke et al. | 428/482 |
| 5,698,330 | 12/1997 | Bederke et al. | 428/423.1 |

FOREIGN PATENT DOCUMENTS

| | | |
|---|---|---|
| 62-225341 | 10/1987 | Japan . |
| 64-85753 | 3/1989 | Japan . |
| 3134083 | 6/1991 | Japan . |

OTHER PUBLICATIONS

Japanese Publication No. 3–134083 Abstract, Jun. 7, 1991 1 p., English–language.
Japanese Publication No. 62–225341 Claims. Oct. 3, 1987, 1 p., English–language.
Japanese Publication No. 1–85753 Abstract, Mar. 30, 1989, 1 p., English–language.

*Primary Examiner*—Paul Thibodeau
*Assistant Examiner*—Sheeba Ahmed
*Attorney, Agent, or Firm*—Webb Ziesenheim Logsdon Orkin & Hanson, P.C.

[57] ABSTRACT

A coated metal sheet has undercoat and topcoat paint films formed on the metal substrate. The undercoat film is composed of polyester paint, which is preferably prepared by adding methylated or butylated melamine resin as a curing agent to hydroxyl group-containing macromolecular polyester resin having a glass-transition temperature of 10° C. or higher. The topcoat film is composed of the polyester paint which is preferably prepared by adding an isocyanate curing agent in an amount of 10 wt. % or more to hydrocyl group-containing macromolecular polyester resin. The substrate metal may be a chemically converted steel sheet, galvarnized steel sheet, stainless steel sheet or aluminum sheet. Since the coated steel sheet is bonded with excellent shear strength and durability, it is useful as the casing of electric home appliance or business machine, or a structural member or part for building or furniture.

1 Claim, 4 Drawing Sheets

COATED METAL SHEET BONDABLE WITH ADHESIVE

This is a continuation of application Ser. No. 08/612,384, filed Mar. 7, 1996, now abandoned.

BACKGROUND OF THE INVENTION

The present invention relates to coated metal sheet which can be bonded with an adhesive, and is useful as the casing of electric home appliances or business machines, building material, furniture or the like.

Coated steel sheets have the undercoat and top coat paint films composed of thermosetting film-forming resin on the surface of the steel sheets which have been subjected to chemical converion treatment such as phosphating or chromating. Such coated steel sheets, especially steel sheets precoated in factories, have been used as structural parts or members for electric home appliances, business machines, building or furniture, since they have beautiful external appearance without the necessity of paint application at a user's side.

However, when the coated sheet member is fixed by welding or calking, its external appearance is significantly deteriorated due to the damage of the paint film at the welded or calked part. The paint film is deformed to a state easy to separate from the steel substrate by the welding or calking, too. Since the defects formed in the paint film act as the starting points to promote corrosion, the external appearance becomes inferior due to the trace of rust flow.

The deterioration of paint film can be avoided by bonding coated steel sheet members with an adhesive instead of welding or calking. For instance, coated steel sheets are bonded with a hotmelt-type adhesive in the presence of an intermediate liquid film having sufficient wettability, as disclosed in Japanese Patent Application Laid-Open 3,134083. Various kinds of bondable coated steel sheets are proposed in Japanese Patent Applications Laid-Open 62-225341 and 64-85753.

Recently, the demand for coated steel sheets having good workability has become stronger. In response to the demand, the composition of polyester resin with melamine resin has been used as the paints which are applied to form undercoat and topcoat films on a steel substrate. However, the combination of polyester resin with melamine does not sufficiently satisfy the requirements for the purpose. Even when the coated steel sheets are bonded with a structural adhesive such as two-pack liquid acryl resin, initial adhesiveness is poor, and adhesion durability is likely reduced with the lapse of usage over a long period. Especially, when the coated steel sheet after being bonded is exposed to a wet atmosphere, the adhesion durability becomes poor in a short time. Consequently, the structural body assembled with an adhesive is not suitable for long-term use, due to poor durability.

SUMMARY OF THE INVENTION

An object of the present invention is to enhance the moisture resistance of a coated metal sheet.

Another object of the present invention is to provide a coated metal sheet improved in initial adhesiveness and adhesion durability, by using undercoat and top coat paints in the special combination to keep excellent adhesion strength over a long term even in a wet atmosphere.

A coated metal sheet according to the present invention has undercoat and topcoat paint films formed on the surface of a metal substrate such as a phosphated steel sheet, chromated steel sheet, stainless steel sheet, galvanized steel sheet or aluminum sheet. The undercoat film is composed of polyester paint. The topcoat film is composed of polyester paint containing an isocyanate curing agent.

The undercoat paint film is preferably composed of polyester paint which is prepared by adding methylated or butylated melamine resin as a curing agent to hydroxyl group-containing macromolecular polyester resin having a glass-transition temperature of 10° C. or higher. The topcoat paint film is preferably composed of polyester paint which is prepared by adding an isocyanate curing agent in an amount of 10 wt. % or more to an hydroxyl group-containing macromolecular polyester resin. The isocyanate may be an isophorone type having the following structural formula of:

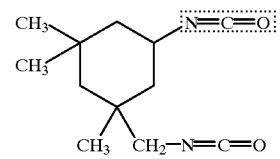

ISOPHORONE TYPE

DESCRIPTION OF THE PREFERRED EMBODIMENTS

Figure 1:
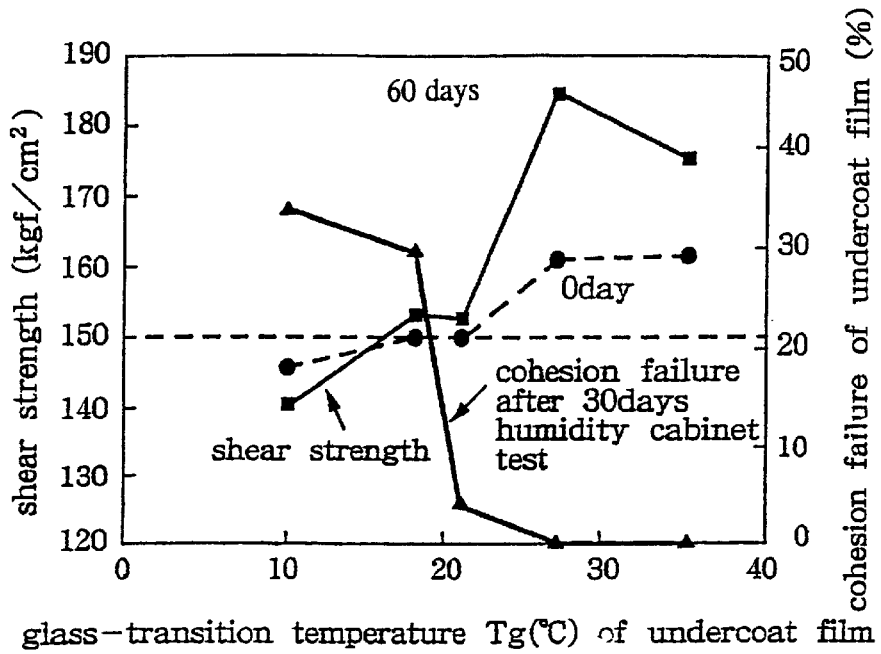
FIG. 1 is a graph showing the effect of the glass-transition temperature $T_g$ of undercoat paint film on shear strength.

Two pack-liquid acryl adhesives have been used for bonding coated steel sheets in various fields. The two-pack liquid acryl adhesives are second-generation acryl adhesives. Especially two-package systems have been mainly used. The two-package adhesive consists of a base A comprising acryl monomer, elastomer and an initiator, and a base B comprising acryl monomer, elastomer and a reducing agent. The two-package adhesive has the feature that the mixing ratio of the base A with the base B can be adjusted within a broad range and the power to bond steel sheets with uniform adhesion strength.

However, when a conventional coated steel sheet is bonded with such an adhesive, initial adhesion strength is likely reduced due to the damage of a paint film at the boundary in contact with the adhesive. The cohesion strength of the paint film is rapidly reduced in a wet atmosphere, too. In order to improve the adhesiveness of the coated steel sheet, the kinds of the undercoat and topcoat paints shall be determined in relation with an adhesive to be used.

According to our researches, when a paint film has a glass-transition temperature lower than 10° C., its cohesion strength is poor due to high water permeability. The moisture resistance of the paint film is improved as the rising of the glass-transition temperature above 10° C., so that the undercoat film is surely prevented from cohesive failure. However, when the glass-transition temperature exceeds 30° C., the workability of the coated steel sheet is inferior.

The moisture resistance is affected by the degree of a baking temperature after paint application, too. The moisture resistance becomes higher with the raising of the baking temperature. The influences of an adhesion promotor or a melamine curing agent on the moisture resistance are relatively small.

The reactivity of the coated steel sheet to a two-pack liquid acryl adhesive is enhanced by adding isocyanate as a subsidiary curing agent together with melamine resin to the topcoat paint, so that the coated steel sheets are bonded with high adhesion strength. We suppose the high strength is derived from the formation of urethane bonds between the paint film and isocyanate, since the acryl adhesive contains hydoxyl groups in its molecule.

There are no special restrictions on the kind of isocyanate to be used. Isophorone di-isocyanate is preferable. The mixing ratio of the isocyanate with polyester resin is preferably 10 wt. % or more, especially 12–20 wt. %. If the mixing ratio of the isocyanate exceeds 20 wt. %, the coated steel sheet would be inferior in corrosion resistance and workability.

When the kinds of the undercoat and topcoat paints are specified in the relationship with the adhesive as aforementioned, the coated steel sheet which can be bonded with shear strength of 150 kgf/cm$^2$ or more and keep the high adhesion strength over a long term due to excellent adhesiveness and moisture resistance is obtained. The coated steel sheet obtained in this way is formed to objective shape and then built up to product shape by bonding.

EXAMPLE

Example 1

A galvanized steel sheet of 1.6 mm in thickness hot-dip coated with Zn in adhesion amount of 90 g/m$^2$ was used as steel substrate. After the galvanized steel sheet was degreased with di-chloroethylene vapor and conditioned, it was chromated by the spray method so as to form a chromated layer in an adhesion amount of 40 mg/m$^2$ calculated as Cr.

Thereafter, undercoat and topcoat paints were applied onto both surfaces of the treated steel sheet by bar coaters. The undercoat paint film was adjusted to dry thickness of 4–8 μm and cured by baking it 70 seconds in an oven heated at 330° C. The baking was controlled in the manner such that the steel sheet was heated up to 180–220° C. at the highest temperature. The topcoat paint was adjusted to dry thickness of 17–23 μm and cured by baking it 90 seconds in an oven heated at 330° C. in the manner such that the steel sheet was heated up to 220–250° C. at the highest temperature.

Each paint used in this Examle was prepared as follows:
Undercoat Paint

Four kinds of polyester undercoat paints were prepared so that paint films had a glass-transition temperature of 10–35° C. after being cured.

The prepared paint was compounded with two kinds of polyester resin liquid (VILON GK78CS offered by TOYOBO CO., LTD. and SUPER BECKOLITE M6801 offered by DAINIPPONN INK & CHEMICALS, INC.) having different glass-transition temperatures, so as to adjust the glass-transition temperature to a proper level. The obtained resin liquid 40 parts was mixed with 5 parts methylated melamine resin as a curing agent (SUPER BECKAMINE L-105 offered by DAINIPPON INK & CHEMICALS, INC.) 20 parts strontium chromate pigment (offered by KIKUCHI COLOR CO., LTD) and 35 parts the mixed solvent of cyclohexane/solvesso 100 as a viscosity controller, and then dispersed by glass beads.

Topcoat Paint

Five kinds of topcoat paints containing various curing agents were prepared as follows:

Methylated melamine resin (SUPERBECKAMINE L-105 offered by DAINIPPON INK & CHEMICALS, INC.) and isocyanate resin, 10 parts in total, were combinatively used at predetermined ratios and mixed in 50 parts hydroxyl group-containing normal chain polyester resin (BECKOLITE 57-206 offered by DAINIPPON INK & CHEMICALS, INC.) The isocyanate resins used in this Example were isocyanurate trimer of hexamethylene di-isocyanate (HDI) (BURNOCK DB980K offered by DAINIPPON INK & CHEMICALS, INC.) and isocyanurate trimer of isophorone di-isocyanate (IPDI) (B-1370 offered by DAICEL-HULS LTD). 20 parts titanium dioxide and 10 parts isophorone as a viscosity controller were mixed and dispersed in the resin composition by glass beads.

The coated steel sheets were sheared to test pieces having the dimensions of 25 mm×100 mm. The test pieces were bonded with adhesion surface area of 3,125 cm$^2$ using two-pack liquid acryl adhesive. The bonded test pieces were examined to measure initial shear strength as well as shear strength after the humidity cabinet test wherein the bonded test pieces were left alone 60 days in the cabinet kept at 60° C. and R.H. 90%.

Figure 2:
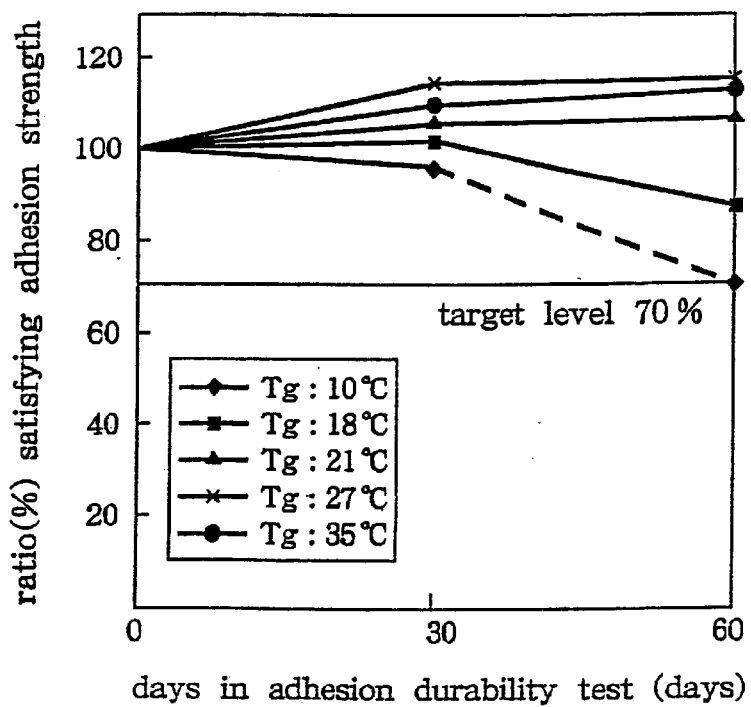
FIG. 2 is a graph showing the effect of the glass-transition temperature $T_g$ of undercoat paint on the period during which adhesion durability is held at a necessary level.

The measured values of the shear strength and the ratio of cohesion failure were researched in relation with the glass-transition temperature $T_g$ of the undercoat paint film. The results are shown in FIGS. 1 and 2. It is noted from FIG. 1 that the glass-transition temperature $T_g$ had big influence on the shear strength and that cohesion failure after the humidity cabinet test was remarkably suppressed by raising the glass-transition temperature to $T_g$ 20° C. or higher.

The reliability of adhesion strength was assured by raising the glass-transition temperature $T_g$. That is, the adhesion strength was not reduced after the lapse of a long term, by raising the glass-transition temperature to 20° C. or higher, as shown in FIG. 2. Although the topcoat paint used in the case shown in FIG. 2 was prepared by mixing type-HDI isocyanate at the ratio of 10 wt. % or more, the same tendency was noted when the mixing ratio of isocyanate was changed.

Figure 3:
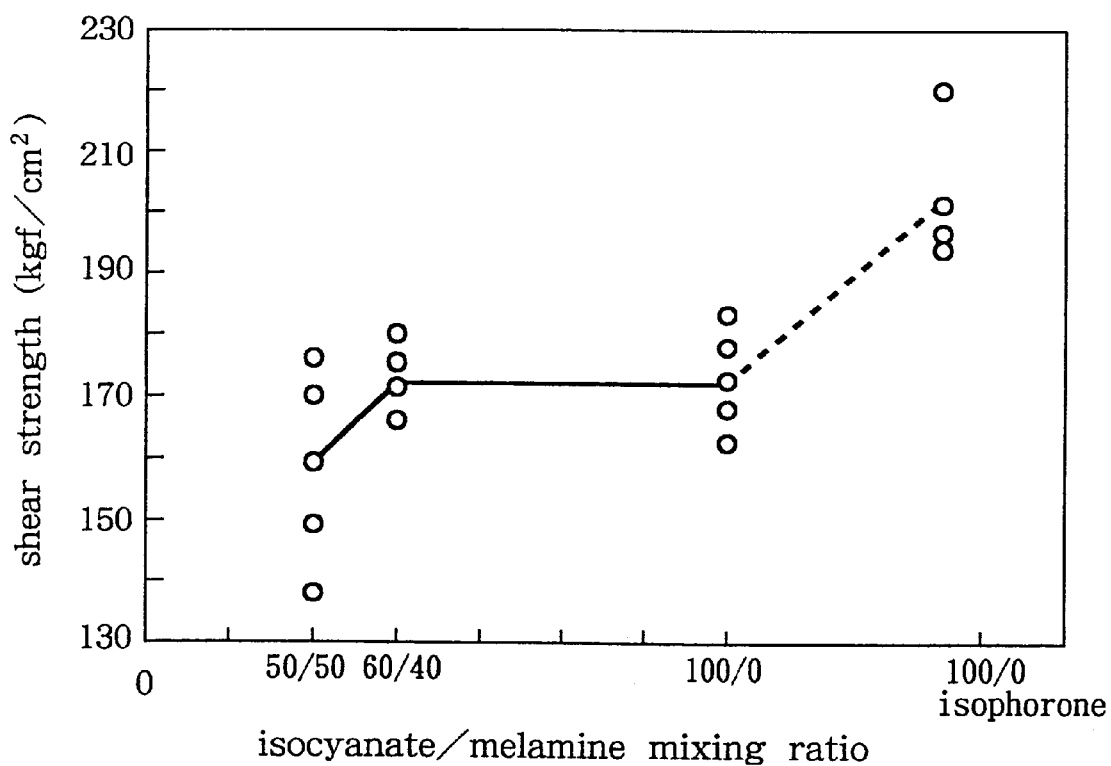
FIG. 3 is a graph showing the effect of the isocyanate/melamine mixing ratio of topcoat paint on shear strength.

The relationship of the initial adhesiveness with the isocyanate/melamine mixing ratio was researched in the case combinatively using isocyanate and melamine as curing agents for the topcoat paint. The result is shown in FIG. 3. It is noted from FIG. 3 that shear strength was substantially deviated at the mixing ratio of 50/50, but stabilized at the mixing ratio of from 60/40 to completely isocyanate. The same tendency was noted, when other isocyanates were used. Consequently, it is recognized that there is not any restrictions on the kind of isocyanate. However, excellent shear strength more than 200 kgf/cm$^2$ was obtained by using IPDI.

Example 2

Coated steel sheets obtained in the same way as that in Example 1 were examined to research such properties required for precoated steel sheets as workability and durability.

The workability was evaluated by the bending test as follows: A test piece cut out of the coated steel sheet was bent at 180 degrees while holding its coated surface outside. In this case, the test piece was bent in the state that a plurality of sheets having the same thickness as that of the test piece were sandwitched between the bent test piece, and the workability was evaluated by the number of sandwiched sheets when cracks were not formed in the paint film.

Figure 4:
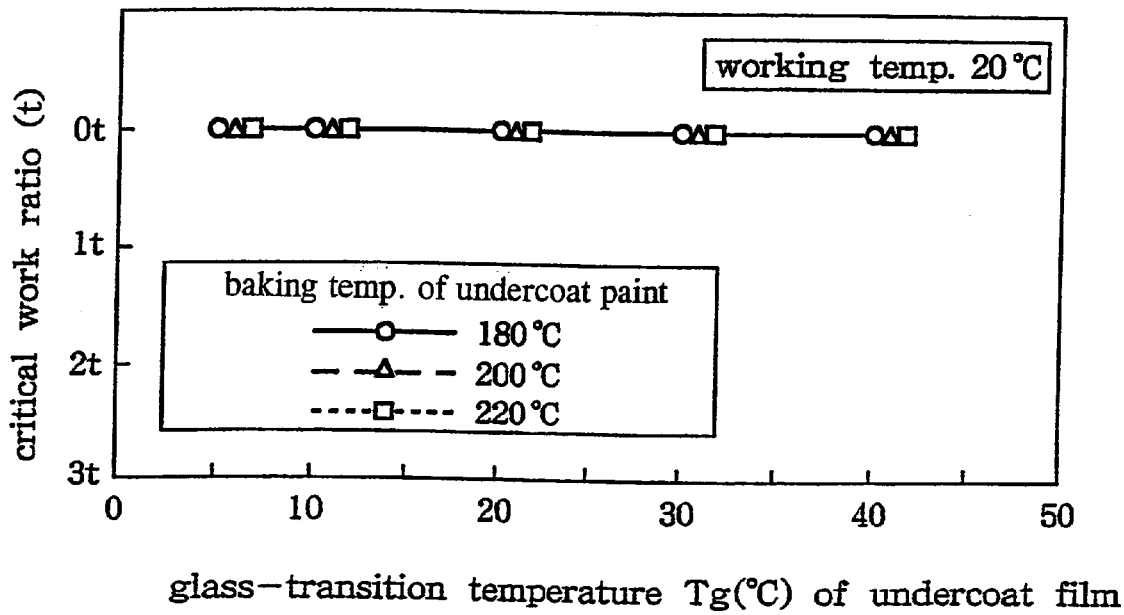
FIG. 4 is a graph showing the effect of the glass-transition temperature $T_g$ of undercoat paint on the workability of a coated steel sheet.
Figure 5:
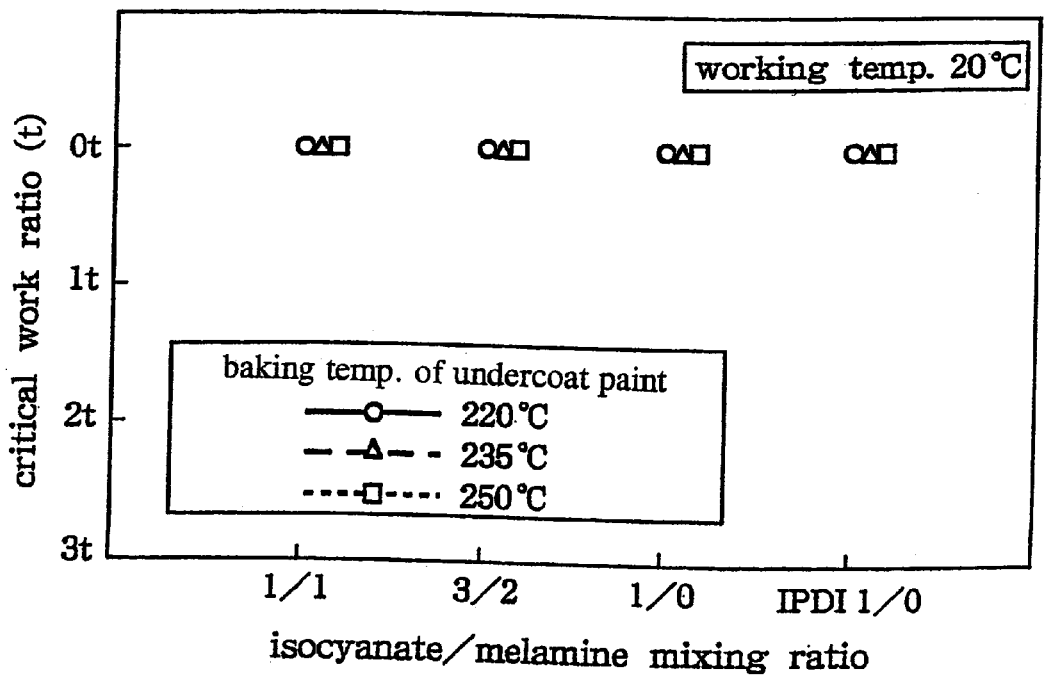
FIG. 5 is a graph showing the effect of the isocyanate/melamine mixing ratio of topcoat paint on the workability of a coated steel sheet.

The results were compared with the glass-transition temperature and the isocyanate/melamine mixing ratio of the undercoat paint. The relationships with the glass-transition temperature and the isocyanate/melamine mixing ration are shown in FIGS. 4 and 5, respectively. It is confirmed from FIGS. 4 and 5 that the coated steel sheets according to the present invention were excellent in workability since no cracks were detected in any test pieces.

The durability of the paint film was evaluated by the salt water spray test regulated in JIS Z2371, wherein salt water was sprayed onto a test piece at a ratio of approximately 1–2 ml/hr. per 80 cm$^2$ the surface area in a cabinet held at 35±2° C.

Test pieces having the dimensions of 6 cm×15 cm were used in this Example. Each test piece was cut out of the coated steel sheet in the manner such that the coated steel sheet was severed downwards at one end to form downward burrs and upwards at the other end to form upward burrs. One third of the coated surface was scratched by NT Cutter for the cross cut test to research the property of the flat face. The durability was evaluated by the biggest width of blisters formed at the cut edge face and the cross cut face and by blisters formed at the flat face according to ASTM D714-56.

Figure 6:
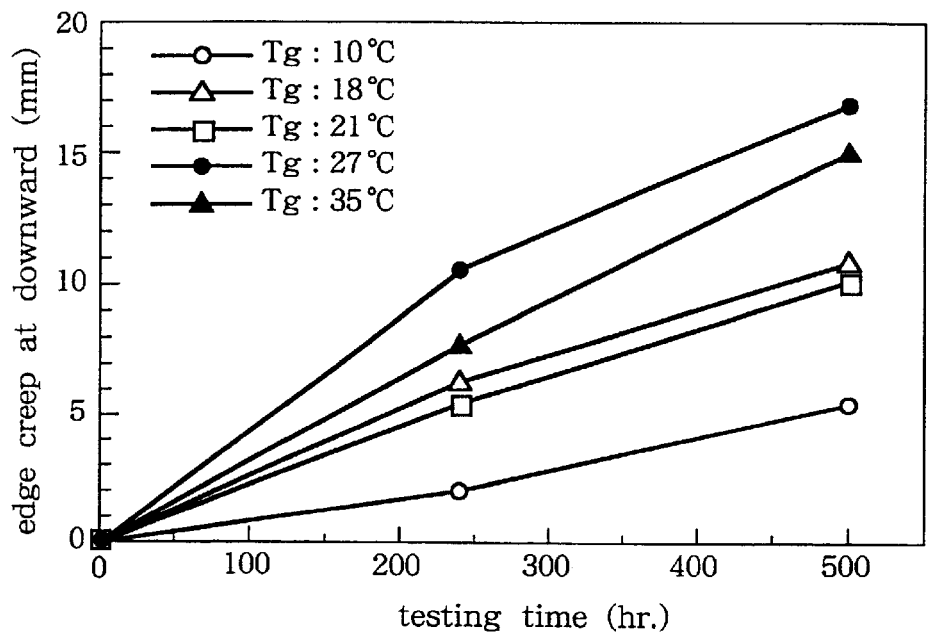
FIG. 6 is a graph showing the effect of the glass-transition temperature of undercoat paint on edge creep at downward.
Figure 7:
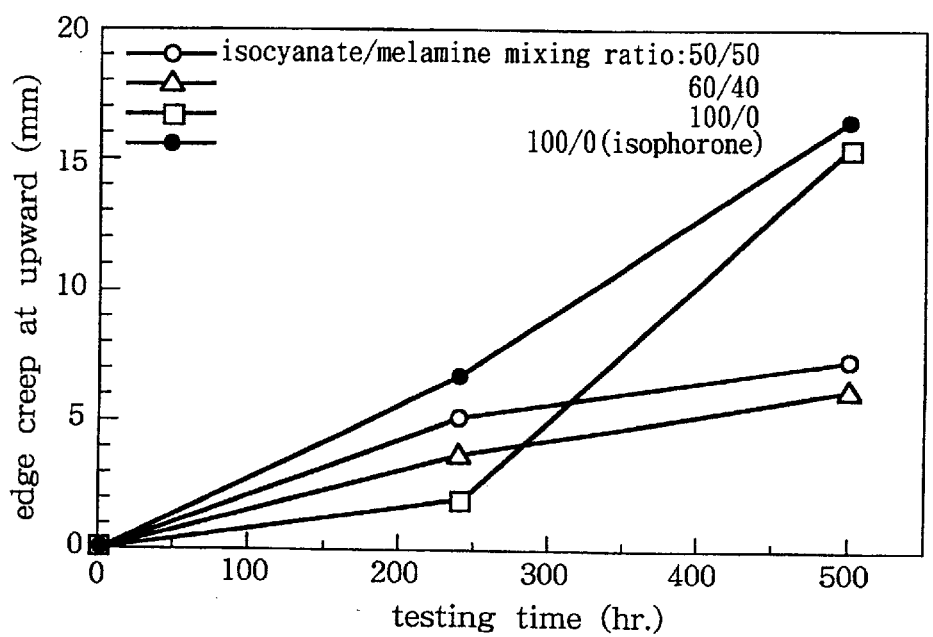
FIG. 7 is a graph showing the effect of the isocyanate/melamine mixing ratio of topcoat paint on edge creep at upward.

The edge creep at downward changed with the lapse of testing time, as shown in FIG. 6. The changing ratio was differentiated in response to the glass-transition temperature $T_g$ of the undercoat paint. The edge creep at upward changed with the lapse of testing time, as shown in FIG. 7. The changing ratio was differentiated in response to the isocyanate/melamine mixing ratio. It is noted from these results that there is the tendency to reduce corrosion resistance a little bit, when the glass-transition temperature $T_g$ of the undercoat paint was higher, or when the isosyanate/melamine mixing ratio of the topcoat paint was higher. However, the corrosion resistance was held within the range allowable for use, when the glass-transition temperature $T_g$ and the isocyanate/melamine mixing ration were controlled according to the present invention.

The coated steel sheet according to the present invention as afore-mentioned has the undercoat paint film composed of polyester paint having a glass-transition temperature of 10° C. or higher and the topcoat paint film composed of polyester paint containing isocyanate resin on the surface of steel substrate after being treated by chemical conversion or the like. This coated steel sheet is useful for the long-term use, as a casing for electric home appliance or business machine, or a structural part or member for building or furniture.

What is claimed is:

1. A steel structure having steel sheets bonded together with a two-pack liquid acryl adhesive, said steel sheets comprising:

a steel substrate selected from the group consisting of stainless steel, galvanized steel and chemically converted steel;

an undercoat layer comprising a polyester paint deposited on the steel substrate, which undercoat layer is prepared by adding at least one of a methylated melamine and a butylated melamine resin as a curing agent to an hydroxyl group-containing macromolecular polyester resin having a glass transition temperature of 10°–30° C; and a top coat layer comprising a polyester paint deposited on the undercoat layer, wherein the polyester paint of the top coat layer is prepared by adding isocyanate and a melamine resin to an hydroxyl group-containing macromolecular polyester resin such that a weight ratio of the isocyanate to the melamine resin is at least 60:40 and such that the amount of the isocyanate in the polyester resin is between 10 wt % and 20 wt %.

\* \* \* \* \*

UNITED STATES PATENT AND TRADEMARK OFFICE
CERTIFICATE OF CORRECTION

PATENT NO. : 5,968,662
DATED : October 19, 1999
INVENTOR(S) : Michiharu Morishige et al.

It is certified that error appears in the above-identified patent and that said Letters Patent is hereby corrected as shown below:

Title Page, ABSTRACT, line 12, "galvarnized" should read --galvanized--.

Column 1 Line 8 "to coated" should read --to a coated--.

Column 1 Line 15 "converion" should read --conversion--.

Column 2 Line 52 "Two pack-liquid" should read --Two-pack liquid--.

Column 4 Line 23 after ")" and before "The" insert period --.--.

Column 5 Line 12 "were" should read --was--.

Column 5 Line 12 "sandwitched" should read --sandwiched--.

Column 5 Line 18 "mixing ration" should read --mixing ratio--.

Signed and Sealed this

First Day of August, 2000

*Attest:*

Q. TODD DICKINSON

*Attesting Officer*     *Director of Patents and Trademarks*